(12) United States Patent
Fall (10) Patent No.: US 9,604,856 B2
(45) Date of Patent: Mar. 28, 2017

(54) INTEGRAL FILTER COMPRESSION SEAL

(71) Applicant: Parker-Hannifin Corporation, Cleveland, OH (US)

(72) Inventor: Ronald Fall, Carmel, IN (US)

(73) Assignee: Parker-Hannifin Corporation, Cleveland, OH (US)

( * ) Notice: Subject to any disclaimer, the term of this patent is extended or adjusted under 35 U.S.C. 154(b) by 695 days.

(21) Appl. No.: 13/860,741

(22) Filed: Apr. 11, 2013

(65) Prior Publication Data

US 2013/0270168 A1 Oct. 17, 2013

Related U.S. Application Data

(60) Provisional application No. 61/622,804, filed on Apr. 11, 2012, provisional application No. 61/791,639, filed on Mar. 15, 2013.

(51) Int. Cl.
*C02F 1/00* (2006.01)
*B01D 29/15* (2006.01)
*B01D 29/96* (2006.01)

(52) U.S. Cl.
CPC .............. *C02F 1/001* (2013.01); *B01D 29/15* (2013.01); *B01D 29/96* (2013.01); *B01D 2201/0407* (2013.01); *B01D 2201/4053* (2013.01); *B01D 2201/4076* (2013.01); *B01D 2201/602* (2013.01); *C02F 1/004* (2013.01); *C02F 2201/004* (2013.01); *C02F 2201/006* (2013.01)

(58) Field of Classification Search
CPC .... C02F 1/001; C02F 1/004; C02F 2201/006; C02F 2201/004; B01D 29/96; B01D 29/15; B01D 2201/0407; B01D 2201/602; B01D 2201/4076; B01D 2201/4053; B01D 2201/34; B01D 2201/291; B01D 2201/296
USPC ........ 210/445, 232, 497.01, 493.2, 485, 450
See application file for complete search history.

(56) References Cited

U.S. PATENT DOCUMENTS

| | | | |
|---|---|---|---|
| 5,770,066 A | 6/1998 | Coates | |
| 6,103,119 A * | 8/2000 | Clements et al. | 210/493.1 |
| 6,514,420 B2 | 2/2003 | Kuennen et al. | |
| 2003/0201221 A1* | 10/2003 | Durre | B01D 27/08 210/444 |
| 2004/0035097 A1* | 2/2004 | Schlensker et al. | 55/498 |
| 2009/0184063 A1* | 7/2009 | Brennan | B01D 29/15 210/767 |
| 2010/0064646 A1* | 3/2010 | Smith et al. | 55/501 |
| 2010/0294707 A1 | 11/2010 | Abdalla et al. | |

* cited by examiner

*Primary Examiner* — Madeline Gonzalez
(74) *Attorney, Agent, or Firm* — Renner, Otto, Boisselle & Sklar, LLP (57) ABSTRACT

A filter cartridge for installation in a housing having a housing seat includes a filtration media compiled in a cylindrical pack having a radially outer face, a radially inner face defining a central cavity, a first axial end face, and a second axial end face. An end cap having an attachment portion is bonded and sealed to an axial end of the filtration media. A hub portion connects the attachment portion to a non-circular locking portion axially spaced from the attachment portion. The locking portion extends radially beyond the width of the hub portion and includes a sealing face having at least one annular sealing element for sealing against the housing seat.

13 Claims, 7 Drawing Sheets

INTEGRAL FILTER COMPRESSION SEAL

RELATED APPLICATIONS

This application claims the benefit of U.S. Provisional Application No. 61/622,804 filed Apr. 11, 2012 and U.S. Provisional Application No. 61/791,639 filed Mar. 15, 2013, both of which are hereby incorporated herein by reference.

FIELD OF INVENTION

The present invention relates generally to filters, and more particularly to a keyed filter incorporating an end face seal.

BACKGROUND

Traditional seals used on filters in fluid processing applications either incorporate an O-ring seal where an adapter with the O-ring seal(s) are pressed into a cup or onto a post-type fixture where a defined amount of compression is achieved. An alternative method would include sealing plates or spring fixtures that are compressed against gaskets on a surface of a filter end cap.

SUMMARY OF INVENTION

A multi-barrier disinfection system utilizes a biological filter in combination with a UV water purification system. The combination of these two technologies has been shown to provide up to a 6 log reduction in biological organisms which meets or exceed the Federal Drug Administration ground water regulation. To ensure that the integrity of the system is maintained, a unique seal design has been developed to insure the correct filters are utilized within the validated filter system.

Therefore, provided is a keyed-type adapter/seal, where the key is the oval shape of the end cap. The purpose of the keyed configuration is to ensure that only the validated cartridge configuration for the multi-barrier disinfection system can be utilized. The incorporation of a non-validated substitute type filter would negate the validation of the system itself. In addition, the oval shape of the male adapter used in conjunction with the cam in the housing receiver achieves a defined amount of compression on the O-ring seals.

According to one aspect of the invention, a filter cartridge for installation in a housing having a housing seat includes a filtration media compiled in a cylindrical pack having a radially outer face, a radially inner face defining a central cavity, a first axial end face, and a second axial end face; an end cap having an attachment portion bonded and sealed to an axial end of the filtration media, and a hub portion connecting the attachment portion to a non-circular locking portion axially spaced from the attachment portion, the locking portion extending radially beyond the width of the hub portion and including a sealing face having at least one annular sealing element for sealing against the housing seat.

Optionally, the hub portion includes an annular tubular structure, interconnecting the central cavity and a central opening in the locking portion.

Optionally, the locking portion, hub portion, and attachment portion are formed in one piece.

Optionally, the locking portion and the attachment portion are formed in one piece.

Optionally, the annular sealing element includes first and second resilient sealing elements.

Optionally, the annular sealing element includes a first axially outwardly facing annular groove, and a first resilient sealing element disposed in the groove for sealing the end cap to the housing seat.

Optionally, the annular sealing element further includes a second resilient sealing element supported within a second axially outward facing annular groove, the second annular groove located in radially-spaced relation to the first groove.

Optionally, the locking portion has an oval peripheral configuration.

Optionally, the non-circular locking portion has a longitudinal axis extending along a longer dimension and a transverse axis extending along a shorter dimension.

Optionally, the longitudinal axis and the transverse axis are orthogonal to each other.

Optionally, the dimension of the locking portion along the longitudinal axis is greater than a corresponding width of the attachment portion.

According to another aspect, a filter assembly includes a filter housing and the filter cartridge described above. The filter housing includes a non-circular receiving socket sized to receive the locking portion; an internal sealing surface with a fluid aperture, the sealing surface juxtaposed to the sealing face of the locking portion when the locking portion is inserted into the receiving socket; and an internal cam surface located to bear against a locking surface of the locking portion and tending to force the sealing face of the locking portion against and into sealing relation with the internal sealing surface of the receiving socket, when the cartridge is rotated with respect to the receiving socket.

Optionally, the cam surface includes a detent surface configured to engage a complimentary detent surface of the locking portion when the cartridge is rotated with respect to the receiving socket.

Optionally, the detent surface is positioned to engage the complimentary detent surface when the cartridge is rotated ninety degrees with respect to the receiving socket.

The foregoing and other features of the invention are hereinafter described in greater detail with reference to the accompanying drawings.

DETAILED DESCRIPTION

Figure 1:
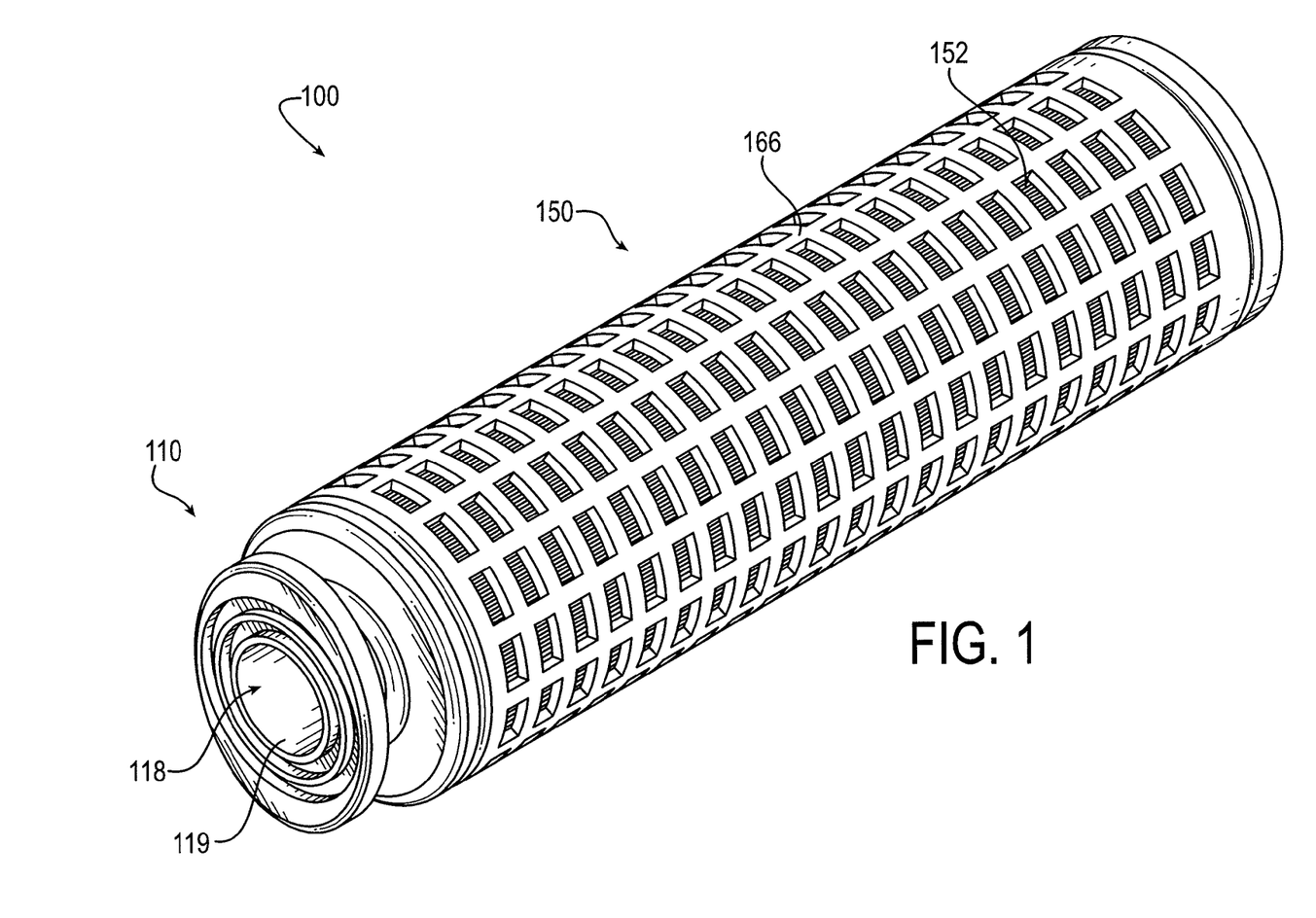
FIG. 1 shows a perspective view of an exemplary filter cartridge.
Figure 2:
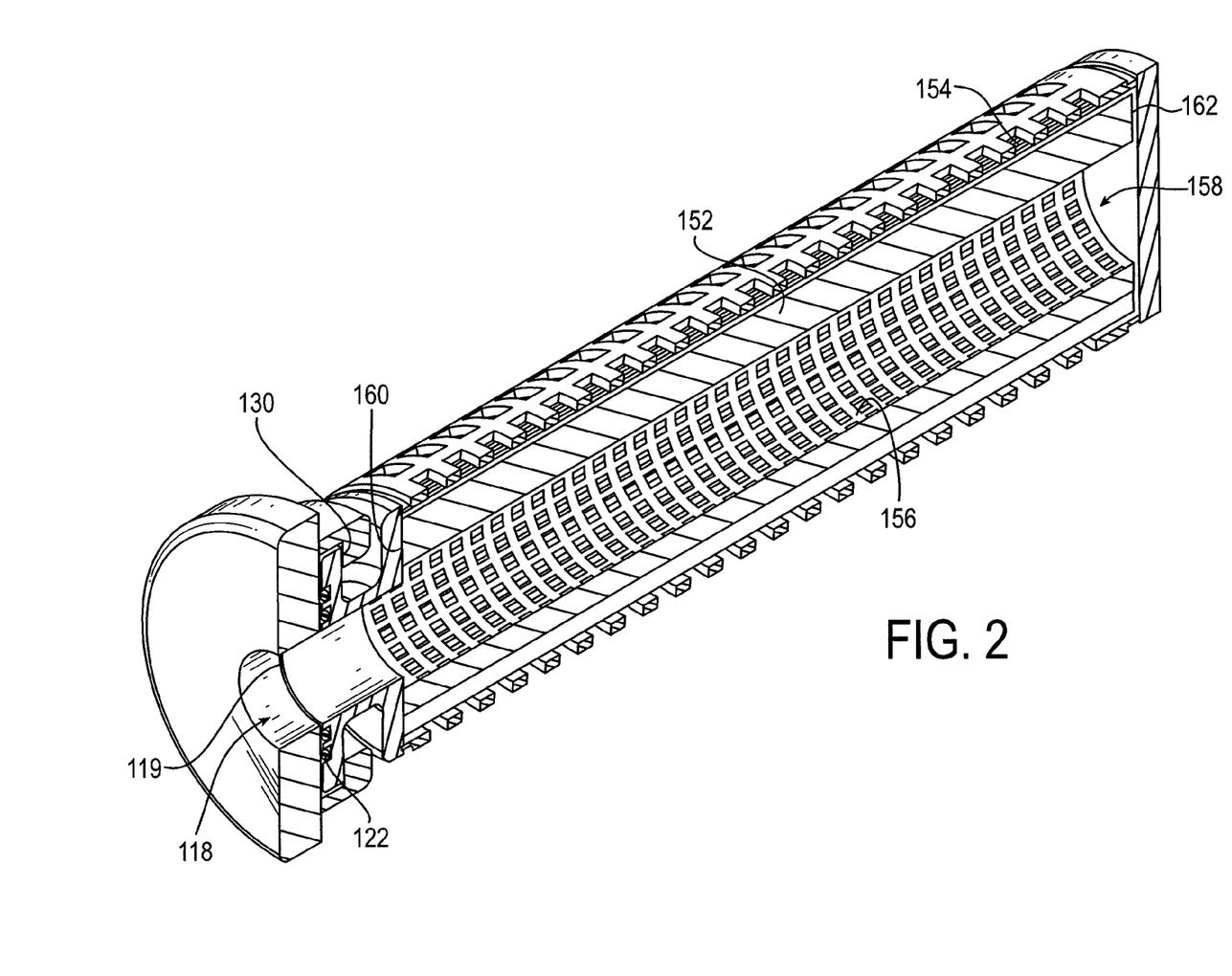
FIG. 2 shows a perspective cross-sectional view of the exemplary filter cartridge installed in a filter housing.
Figure 3:
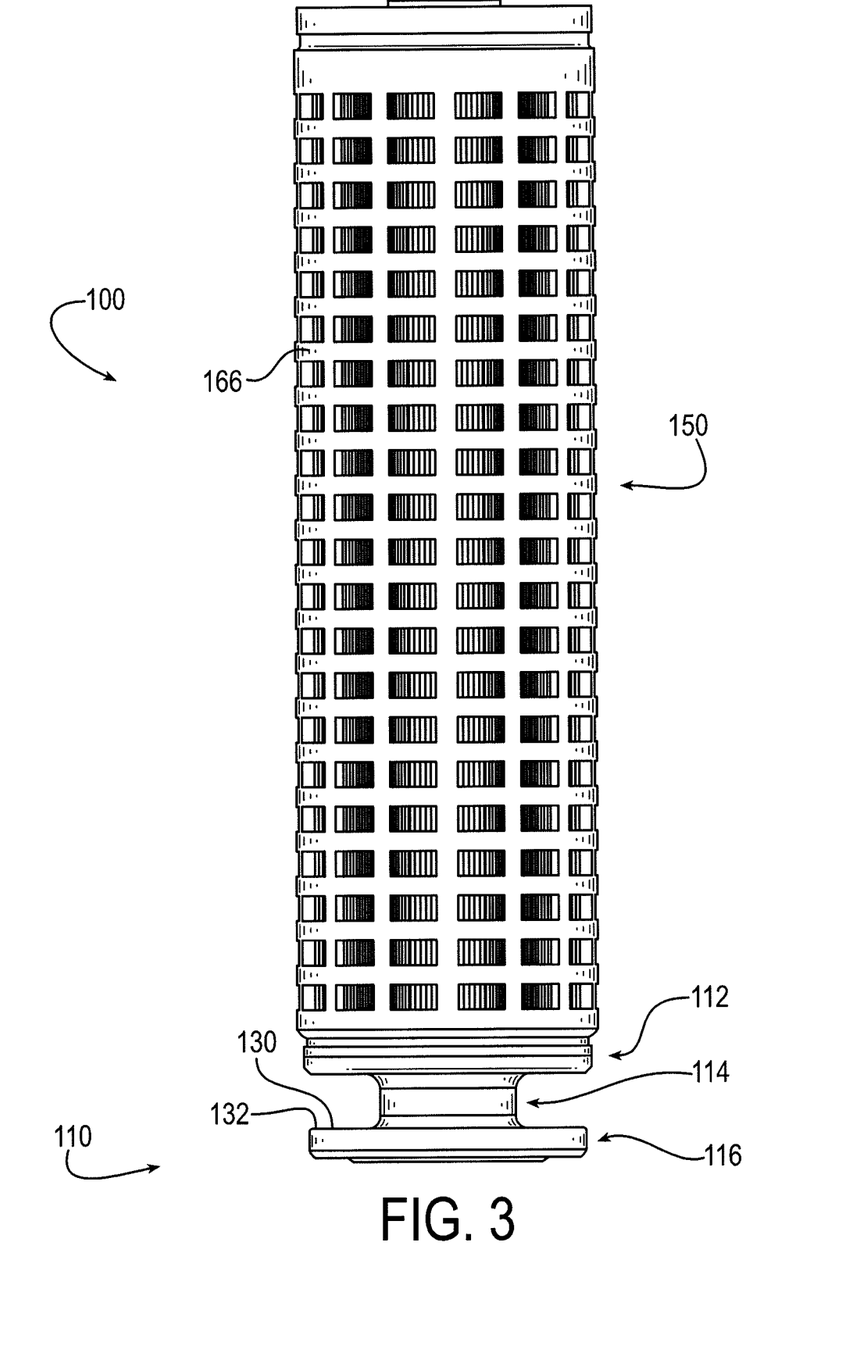
FIG. 3 shows a side view of the exemplary filter cartridge.
Figure 4:
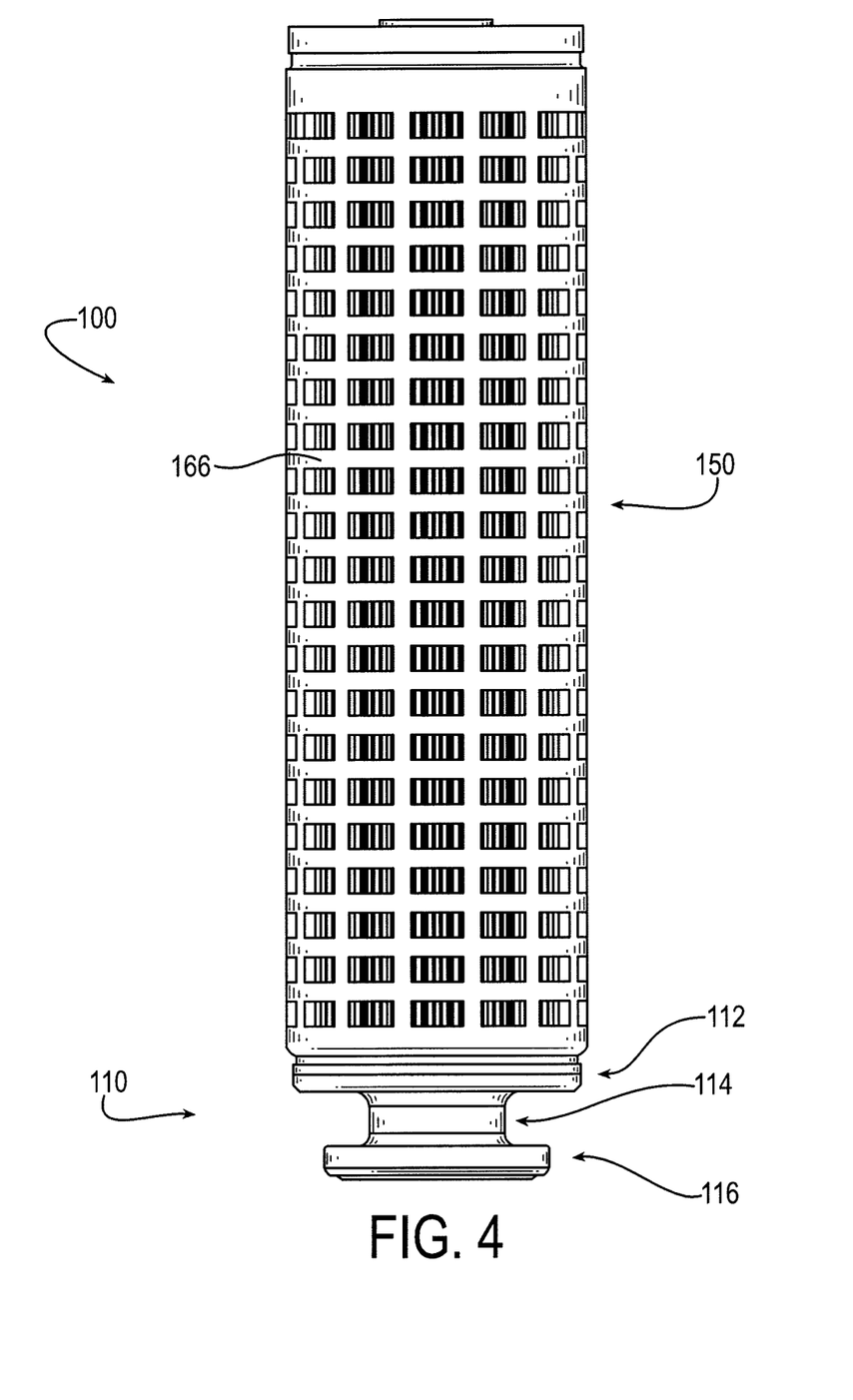
FIG. 4 shows a side view of the exemplary filter cartridge.
Figure 5:
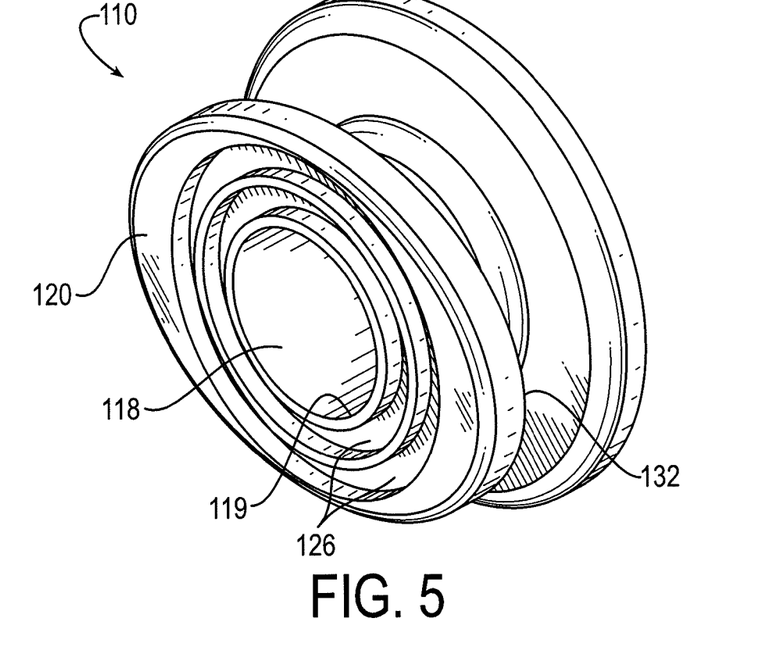
FIG. 5 shows a perspective view of an exemplary filter end cap.
Figure 6:
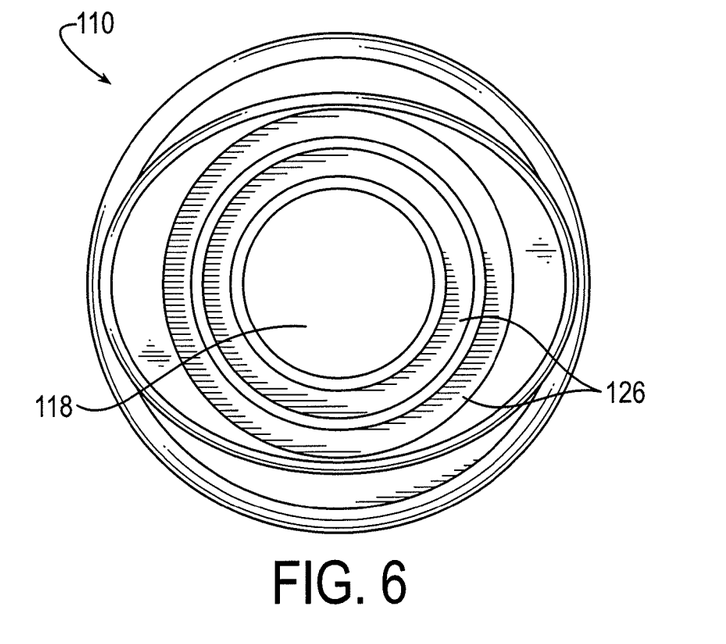
FIG. 6 shows a front view of an exemplary filter end cap.

Referring first to FIGS. 1 and 2, shown is an exemplary filter cartridge 100 having a male filter cartridge end cap/adapter 110 with an oval design attached to a filtration portion 150.

The filtration portion 150 includes a filtration media 152 compiled in a cylindrical pack having a radially outer face 154, a radially inner face 156 defining a central cavity 158, a first axial end face 160, and a second axial end face 162. The filtration media may be of any appropriate material(s) for the desired application. In an exemplary embodiment, the filtration media is a biological filter for use in a multi-barrier disinfection system for purifying water. The filtration portion may be radially surrounded by a filtration housing 166 which may, for example, provide structural support to the filtration portion and/or help to contain the filtration media 152.

Turning to FIGS. 3-6, the end cap 110 has an attachment portion 112 that may be bonded and sealed to an axial end of the filtration media 152. A generally cylindrical hub portion 14 may connect the attachment portion 112 to a non-circular locking portion 116 axially spaced from the attachment portion and extending radially beyond the width of the hub portion 114, thus forming an annular recess surrounding the hub portion 114. The axial spacing, corresponding to the length of the hub portion 114, and therefore the annular recess, may be determined by the configuration of the filter receptacle into which the filter cartridge is installed.

The attachment portion 112, hub portion 114, and locking portion 116 may be of one-piece (as shown) or of multi-piece construction.

The hub portion may be, for example, an annular tubular structure including a central bore 118, interconnecting the central cavity 158 and a central opening 119 in the locking portion 116. The central bore 118 is in fluid communication with the central cavity 158 of the filtration portion 150.

The locking portion 116 including a sealing face 120 having at least one annular sealing element 122 for sealing against the filter receptacle's housing seat. The annular sealing element 122 may include one or more resilient sealing elements 124 or O-rings. In the exemplary embodiment depicted, the annular sealing element 122 includes concentric first and second resilient sealing elements 124. The annular sealing element 122 includes a first axially outwardly facing annular groove 126, and a first resilient sealing element disposed in the groove for sealing the end cap 110 to the filter receptacle's housing seat. The annular sealing element 122 further includes a second resilient sealing element 124 supported within a second axially outward facing annular groove 126, the second annular groove located in radially-spaced relation to the first groove.

The locking portion may be any keyed shape, but in the exemplary configuration depicted the locking portion 126 has an oval peripheral configuration. In other words, the non-circular locking portion 126 has a longitudinal axis (major axis) extending along a longer dimension and a transverse axis (minor) extending along a shorter dimension. The longitudinal axis and the transverse axis are orthogonal to each other. The dimension of the locking portion along the longitudinal axis may be greater than a corresponding width of the attachment portion 112, or may be approximately the same, or may be smaller. In the exemplary end cap depicted, the length of the major axis of the locking portion 116 is approximately equal to the diameter of the attachment portion 112.

Figure 7:
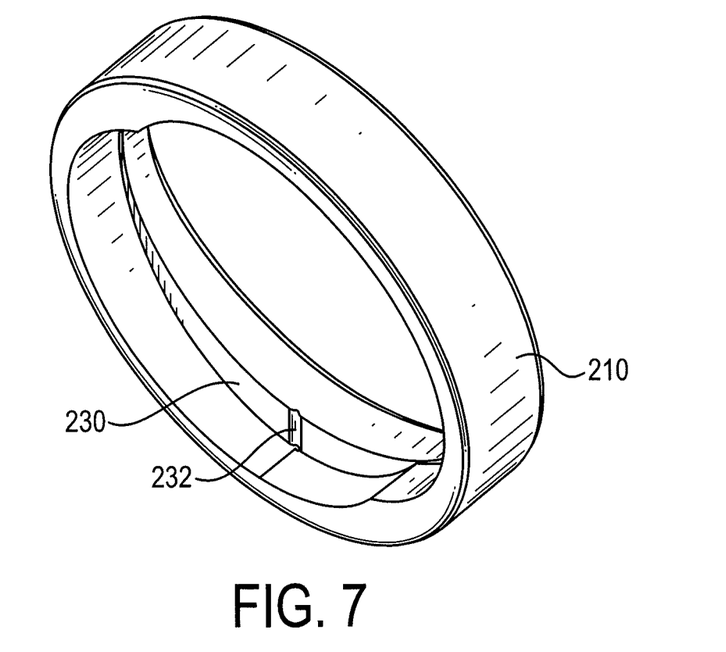
FIG. 7 shows a perspective view of an exemplary filter receptacle.
Figure 8:
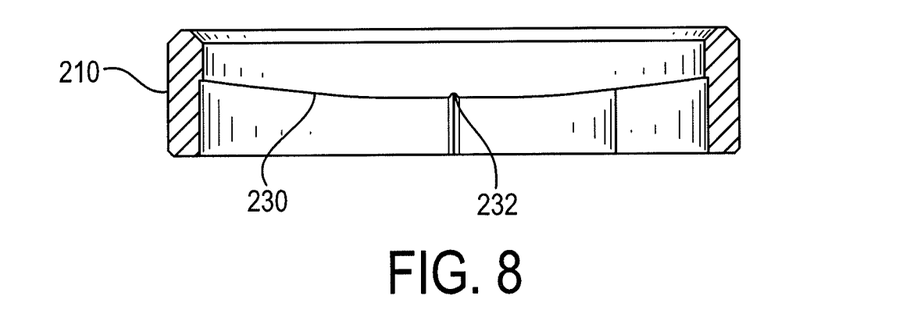
FIG. 8 shows a cross-sectional view of an exemplary filter receptacle.
Figure 9:
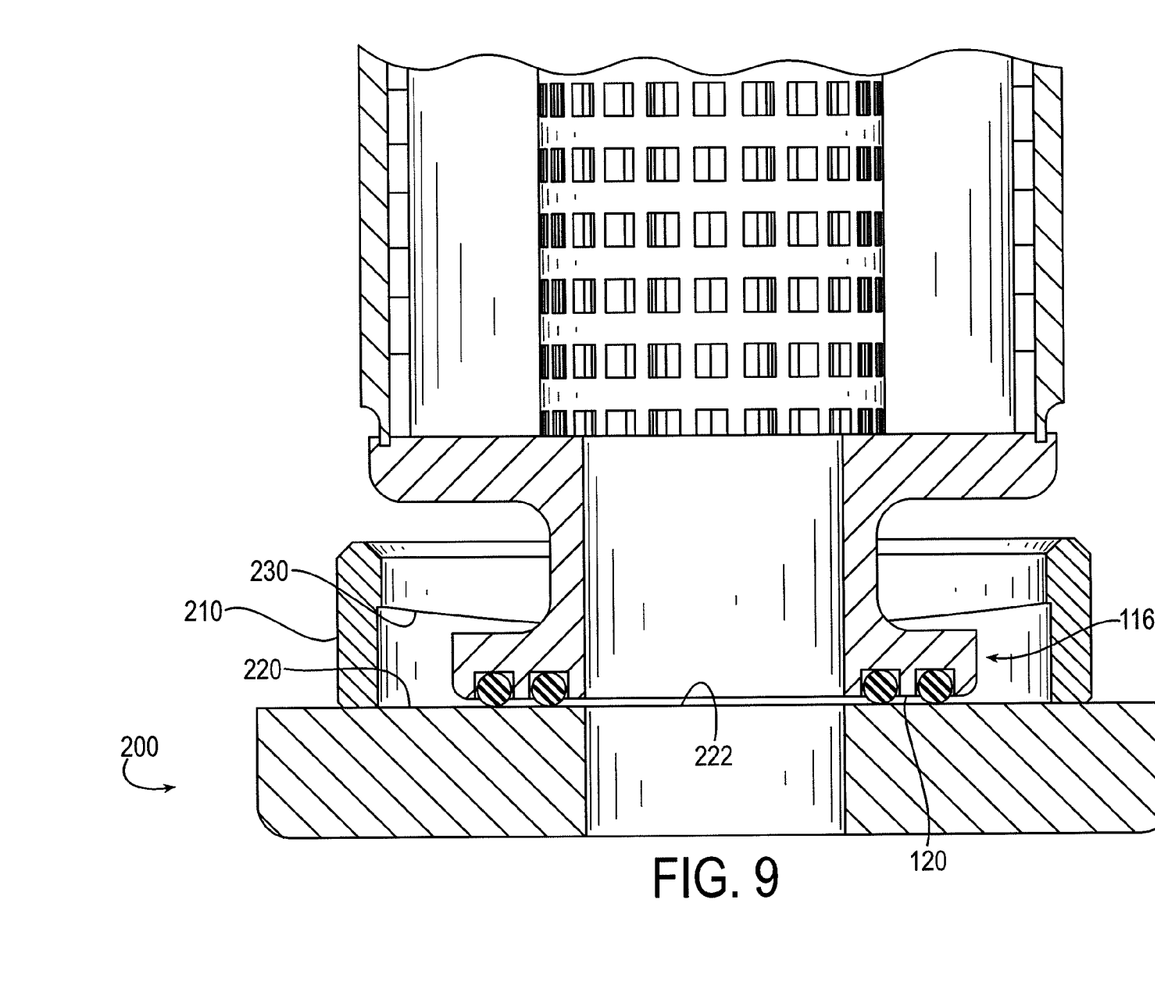
FIG. 9 shows a cross-sectional detail view of an exemplary filter cartridge installed in a filter housing.

Referring now to FIGS. 7-9, the filter cartridge may be installed in a receptacle of a filter housing 200. The filter housing 200 includes a non-circular receiving socket (receptacle) 210 sized to receive the locking portion. The housing has an internal sealing surface 220 with a fluid aperture 222 that would be in fluid communication with the central bore and central cavity of the filter cartridge when the filter cartridge is installed in the filter housing. The sealing surface 220 would be juxtaposed to the sealing face 120 of the locking portion 116 when the locking portion is inserted into the receiving socket 210.

An internal cam surface 230 is located to bear against a locking surface 130 of the locking portion 116 and tends to force the sealing face 120 of the locking portion 116 against and into sealing relation with the internal sealing surface 220 of the receiving socket 210, when the cartridge is rotated with respect to the receiving socket 210. The cam surface 230 is shaped so as to provide a defined amount of compression on the seal of the installed filter cartridge. The cam surface 230 includes a detent surface 232 configured to engage a complimentary detent surface 132 of the locking portion 116 when the cartridge is rotated with respect to the receiving socket 210. In the exemplary embodiment depicted, the detent surface 132 is positioned to engage the complimentary detent surface 132 when the cartridge is rotated ninety degrees with respect to the receiving socket 210.

The female receiving socket 210 within the filter housing 200 would have a mating (e.g., oval) opening to match the male (e.g., oval) end cap locking portion 116. Once the cartridge is inserted fully into the housing receiver socket, the installer would rotate the cartridge and end cap an amount (for example, 90 degrees) to a defined stop within the housing receiver socket. As the cartridge is rotated, the cam in the housing drives the sealing face of the filter end cap locking portion toward the sealing surface and forces a compressor on the O-ring seals to a pre-determined compression percentage.

A difference between the process O-ring seal design over customary designs is that customary O-ring seals utilized in process fluid applications are generally located on the perimeter of a sealing fixture. These filter cartridges are often held in place with a spring or compression plate to ensure the filter seals are properly maintained while in service. Alternatively, some customary designs include two tabs extending radially outward and positioned 180 degrees opposite each other. The tabs lock into a channel as the filter is turned into place and sealed within the housing. The only function of the tabs is the hold the filter in place, and the tabs provide no compression force on the seals. In contrast, an exemplary embodiment involves placing the seals within a top locking portion sealing face of a filter cartridge end cap and as the end cap is rotated and snapped into position, the targeted amount of compression is achieved to ensure the appropriate seal is attained. A filter cartridge using this method is held securely into place and no secondary fixtures are required to maintain the required seal.

The receiver socket may be a detachable in order to change the profile of the filter cartridge locking portion that is accepted. In combination with filters having respective locking portions that differ depending on the qualities of the filter media in the filter, the receiver socket can be chosen to accept on filters of the desired or predetermined type.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter cartridge for installation in a housing having a housing seat, comprising:
   a filtration media compiled in a cylindrical pack having a radially outer face, a radially inner face defining a central cavity, a first axial end face, and a second axial end face;
   an end cap having an attachment portion bonded and sealed to an axial end of the filtration media, and a hub portion connecting the attachment portion to a non-circular locking portion axially spaced from the attachment portion, the locking portion extending radially beyond the width of the hub portion and including a sealing face having at least one annular sealing element for sealing against the housing seat,
   wherein the annular sealing element includes a first axially outwardly facing annular groove, and a first resilient sealing element disposed in the groove for sealing the end cap to the housing seat.

2. The filter cartridge of claim 1, wherein the hub portion comprises an annular tubular structure, interconnecting the central cavity and a central opening in the locking portion.

3. The filter cartridge of claim 1, wherein the locking portion, hub portion, and attachment portion are formed in one piece.

4. The filter cartridge of claim 1, wherein the locking portion and the attachment portion are formed in one piece.

5. The filter cartridge of claim 1, wherein the annular sealing element includes first and second resilient sealing elements.

6. The filter cartridge of claim 1, wherein the annular sealing element further includes a second resilient sealing element supported within a second axially outward facing annular groove, the second annular groove located in radially-spaced relation to the first groove.

7. The filter cartridge of claim 1, wherein the locking portion has an oval peripheral configuration.

8. The filter cartridge of claim 1, wherein the non-circular locking portion has a longitudinal axis extending along a longer dimension and a transverse axis extending along a shorter dimension.

9. The filter cartridge of claim 8, wherein the longitudinal axis and the transverse axis are orthogonal to each other.

10. The filter cartridge of claim 8, wherein the dimension of the locking portion along the longitudinal axis is greater than a corresponding width of the attachment portion.

11. A filter assembly including a filter housing and the filter cartridge of claim 1, wherein the filter housing includes:
    a non-circular receiving socket sized to receive the locking portion;
    an internal sealing surface with a fluid aperture, the sealing surface juxtaposed to the sealing face of the locking portion when the locking portion is inserted into the receiving socket; and
    an internal cam surface located to bear against a locking surface of the locking portion and tending to force the sealing face of the locking portion against and into sealing relation with the internal sealing surface of the receiving socket, when the cartridge is rotated with respect to the receiving socket.

12. The filter assembly of claim 11, wherein the cam surface includes a detent surface configured to engage a complimentary detent surface of the locking portion when the cartridge is rotated with respect to the receiving socket.

13. The filter assembly of claim 12, wherein the detent surface is positioned to engage the complimentary detent surface when the cartridge is rotated ninety degrees with respect to the receiving socket.

* * * * *